United States Patent [19]

Citta et al.

[11] Patent Number: 4,802,213

[45] Date of Patent: Jan. 31, 1989

[54] SOUND MASKING IN PHASE REVERSAL TV SCRAMBLING SYSTEM

[75] Inventors: Richard W. Citta, Oak Park; John P. Eck; Dennis M. Mutzabaugh, both of Mount Prospect, all of Ill.

[73] Assignee: Zenith Electronics Corporation, Glenview, Ill.

[21] Appl. No.: 19,445

[22] Filed: Feb. 26, 1987

[51] Int. Cl.$^4$ .............................................. G06K 1/02
[52] U.S. Cl. ......................................... 380/7; 380/12; 380/17
[58] Field of Search ......................... 380/7, 12, 13, 17

[56] References Cited

U.S. PATENT DOCUMENTS

| | | | |
|---|---|---|---|
| 3,347,982 | 10/1967 | Bass et al. | 380/7 |
| 4,074,311 | 2/1978 | Tanner et al. | 380/7 |
| 4,099,203 | 7/1978 | Garodnick et al. | 380/7 |
| 4,148,064 | 4/1979 | Reed | 380/7 |
| 4,467,353 | 8/1984 | Citta et al. | 380/12 |
| 4,706,283 | 11/1987 | Citta et al. | 380/12 |
| 4,706,284 | 11/1987 | Citta et al. | 380/12 |

*Primary Examiner*—Salvatore Cangialosi

[57] ABSTRACT

A TV scrambling system includes means for scrambling a TV signal by phase reversing the carrier at a horizontal rate. A sound masking circuit includes a phase locked loop which operates at five times the horizontal frequency. The program sound signal is used to frequency modulate the VCO in the phase locked loop and the output is added to the regular program sound for modulation onto an RF carrier to create an interfering sound signal. Detection of the program sound signal in an unauthorized receiver is accompanied by beating between the 5 H harmonic of the phase reversal frequency and the interfering sound signal, which masks the program sound.

4 Claims, 1 Drawing Sheet

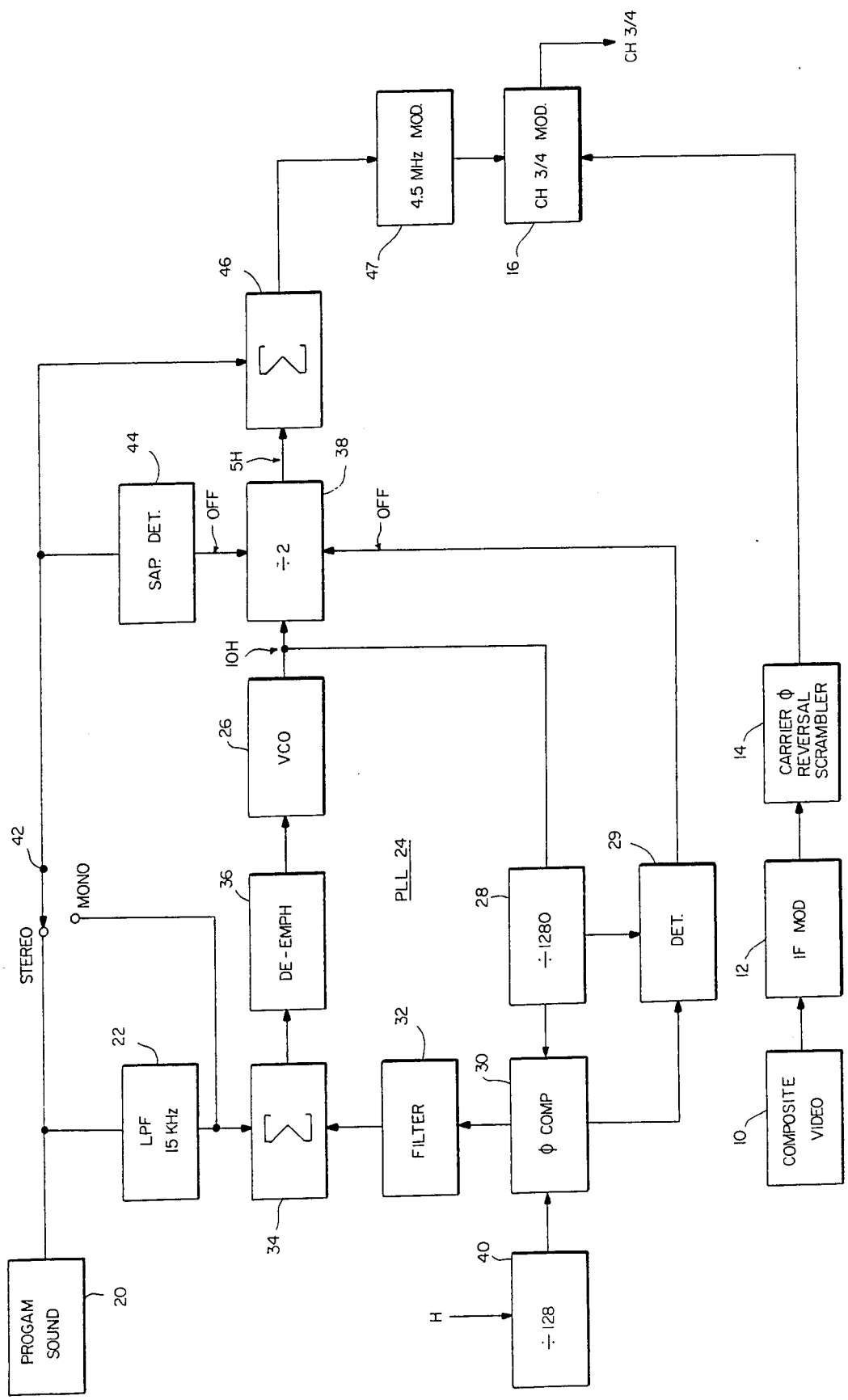

SOUND MASKING IN PHASE REVERSAL TV SCRAMBLING SYSTEM

CROSS REFERENCE TO RELATED PATENT

This invention is useful with apparatus disclosed and claimed in U.S. Pat. No. 4,467,353 issued 8/21/84 entitled "Television Signal Scrambling System and Method" in the names of R. Citta and R. Lee and assigned to Zenith Electronics Corporation.

BACKGROUND OF THE INVENTION AND PRIOR ART

This invention relates generally to television signal scrambling systems and in particular to method and apparatus for enhancing the sound masking in a phase reversal television scrambling system.

As fully described in the above-mentioned related patent, a technique for scrambling television signals involves synchronizing signal (sync) suppression and carrier phase reversal during the horizontal blanking intervals. This technique, with the appropriate use of a synchronous detector, enables recovery of the scrambled television signal by detection of the carrier phase reversal points. In using such a scrambling technique with television receivers having intercarrier sound, a series of harmonics of the carrier reversal frequency is developed during detection by an unauthorized receiver because of the phase reversals. If the carrier reversals are at the horizontal rate, which is the preferred mode of practicing the invention of the above-mentioned related patent, these spurious signals occur at 1 H, 2 H, 3 H, 4 H, 5 H, etc. where H is equal to the horizontal line frequency (approximately 15.75 KHz). It will be appreciated, that if a proper decoder is utilized for receiving and decoding the signal, the carrier phase reversals are corrected and the spurious signals are not present.

The present invention takes advantage of the fact that spurious signals at harmonics of the carrier phase reversal frequency will be present unless the scrambled signal is properly unscrambled, and adds an additional "sound signal" to create interference for masking the television program sound when the signal is received by an unauthorized receiver. The sound masking that occurs is useful for two reasons, one being that in many instances a significant benefit is obtained by unauthorized subscribers merely receiving the audio portion of a scrambled television signal. The other, and more important, reason, is that in many instances material that might be considered offensive by many listeners is garbled to the point of unintelligibility. The audio masking in the scrambling system of the invention has the added advantage that it entails no additional cost in the decoder.

OBJECTS OF THE INVENTION

A principal object of the invention is to provide a method of sound masking in a carrier phase reversal television scrambling system.

Another object of the invention is to provide a novel sound masking system.

A further object of the invention is to provide an improved carrier phase reversal television signal scrambling system.

BRIEF DESCRIPTION OF THE DRAWING

These and other objects and advantages of the invention will be apparent upon reading the following description in conjunction with the drawing, the single figure of which is a block diagram of an encoder incorporating the sound masking of the invention.

DESCRIPTION OF THE PREFERRED EMBODIMENT

Referring to the drawing, a source of composite television video signal 10 is coupled to an IF modulator 12 which, in turn, supplies a carrier phase reversal scrambler 14, the output of which feeds a television modulator 16. These elements are preferably constructed in accordance with the teachings of the above-referenced patent with the composite video signal comprising program video and appropriate synchronizing signal information and the carrier phase reversal scrambler reversing the phase of the intermediate frequency carrier signal during the horizontal blanking intervals. The encoder of the invention also includes a program sound source 20 which is coupled through a pre-emphasis circuit 21 and a low pass filter (LPF) 22 to a summation circuit 34 that is included in a phase locked loop PLL 24. The PLL conventionally includes a voltage controlled oscillator (VCO) 26 having an output frequency of 10 H, that is 10 times the horizontal frequency. The output is divided by 1,280 in a divider circuit 28 and then supplied to one input of a phase comparator circuit 30. The other input of phase comparator 30 is supplied with horizontal synchronizing pulses H which are divided by 128 in a divider 40. The output of the phase comparator 30 is supplied through a filter 32 to the other input of summation circuit 34. The output of summation circuit 34 is supplied through a de-emphasis circuit 36 for controlling the frequency of oscillation of VCO 26.

The PLL circuit described locks up due to the low frequency loop but permits the 10 H output of VCO 26 to be frequency modulated with the program sound signal from program sound source 20. LPF 22 cuts off at approximately 15 KHz for reasons to be explained. The output of VCO 26 is divided by 2 in a divider 38 to produce a 5 H carrier that is frequency modulated with the program sound. This output, which is used as an interfering sound source for masking purposes, is supplied to another summation circuit 46. The output of summation circuit 46 is supplied to a 4.5 MHz modulator 47, which is coupled to modulator 16, all in conventional fashion.

The output of program sound source 20 is also supplied to a stereo terminal of a stereo/monaural switch 42. The monaural terminal of switch 42 is connected to the junction of LPF 22 and summation circuit 34. This arrangement provides for utilization of the encoder device with the recently adopted BTSC television stereo audio and second audio program (SAP) standards. For stereo sound, switch 42 is in the stereo mode and the program sound signal, which contains base band audio information, as well as significantly higher frequency audio modulation, is coupled to a SAP detector 44 and to another input of summation circuit 46. The SAP signal, if present, is also a frequency modulation of a carrier of 5 H frequency which is the same as the output of VCO 26 when passed through divider circuit 38. Thus, as will be explained in more detail, when a SAP signal is received, switch 42 is in the stereo mode and the sound masking circuit is disabled. This prevents interference with the SAP signal. SAP detector 34 therefore operates to disable divider 38 and preclude addition of the sound masking signal to the program sound signal that is coupled to summation circuit 46 and supplied to 4.5 MHz modulator 47. Another output of phase comparator 30 is coupled to a detector 29, which is also supplied with an output from divider 28. Detector 29 develops a disabling signal for divider 38 for preventing the sound masking signal from being supplied in the event no lock-up has been achieved. This could occur if, for some reason, the horizontal signal was not present and the arrangement precludes garbling the sound in that event. When switch 42 is in the monaural position, the program sound information from program sound source 20 is pre-emphasized and supplied through LPF 22 to summation circuit 46. This removes any spurious high frequencies that may be present in the program sound signal.

In accordance with the invention, the program sound source is used to frequency modulate a carrier of 5 H frequency which is added to the regular program sound signal and transmitted to subscribers. Authorized receivers are not exposed to the harmonics of the horizontal frequency because the carrier phase reversals are corrected. Unauthorized receivers, however, are subjected to the harmonics of H frequency and the 5 H harmonic interacts with the 5 H frequency modulated signal to produce a frequency modulated signal centered at zero frequency which is in the base band audio spectrum. The carrier phase reversals cause the VCO frequency in a TV synchronous detector to jump. This causes the 4.5 MHz audio carrier to jump out of the FM detector bandpass and the 5 H frequency modulated signal drops out momentarily. This happens because the 5 H frequency modulated signal drops out momentarily at an H rate, in effect modulating the 5 H frequency modulated signal with the H harmonics, the 5 H harmonic being the most important. The presence of the frequency modulated signal at a zero frequency carrier produces strange and unintelligible noises which masks the normal program sound signal. In an authorized receiver, these harmonics are not present to interact with the added frequency modulated signals at 5 H frequency and these signals are out of the human hearing range.

It will be appreciated that differing detection circuits will yield differing results in terms of sound masking and also in terms of the amount of interfering sound signal which may be present even with authorized decoding systems. Utilization of a 5 H carrier has yielded an optimum result in terms of interference for authorized decoders and effective sound masking for unauthorized decoders over a wide range of television detection systems.

What has been described is a novel sound masking system for use in a phase reversal TV scrambling system. It is recognized that numerous changes in the described embodiment of the invention may be made by those skilled in the art without departing from its true spirit and scope. The invention is to be limited only as defined in the claims.

What is claimed is:

1. In a television scrambling system utilizing carrier phase reversals at horizontal line frequency and including a program sound signal, the improvement comprising a method of sound masking in intercarrier television systems without authorized receivers that correct the carrier phase reversals and that therefore generate harmonics of said horizontal line frequency comprising:
   adding an interfering sound signal including a carrier that is a harmonic of said horizontal line frequency and outside the audio spectrum to said program sound signal for reacting with harmonics of said carrier phase reversals to create interference with said program sound signal upon detection by unauthorized intercarrier type receivers.

2. The method of claim 1 wherein said interfering sound signal is developed by frequency modulating said program sound signal onto said line frequency related carrier.

3. The method of claim 2 wherein said carrier is at 5 H frequency.

4. In a television encoding system including means for scrambling a television video signal by carrier phase reversal at line frequency rate and means for supplying a program sound signal for modulation onto an RF carrier along with the scrambled video signal;
   phase locked loop means for generating a frequency that is harmonically related to said line frequency rate of phase reversal;
   means for supplying an interfering audio signal to said phase locked loop means for modulating said harmonically related frequency; and
   means for combining said program sound signal with said modulated frequency, the modulated frequency reacting with harmonics of said line frequency rate phase reversals, in unauthorized intercarrier television receivers that do not correct said phase reversals, to generate a masking audio signal.

* * * * *